July 6, 1937.  F. C. HOLTZ  2,085,751
JEWEL BEARING FOR ELECTRIC METERS AND THE LIKE
Filed July 3, 1935
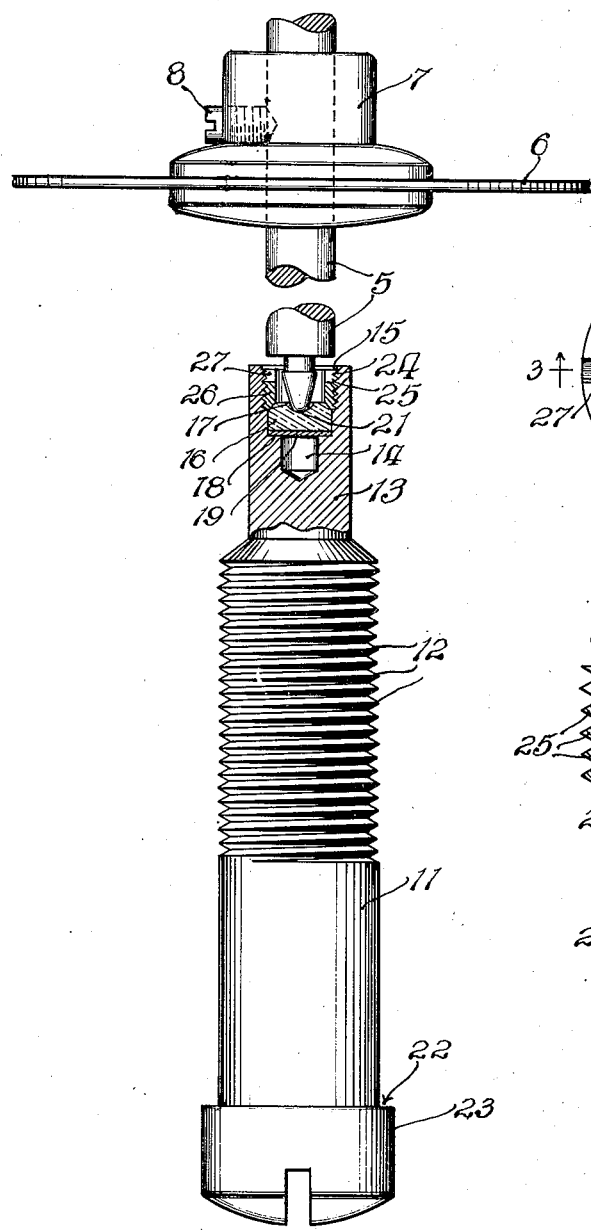
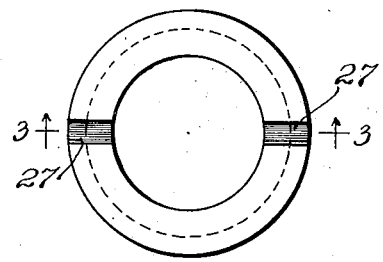
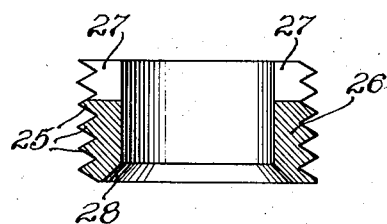
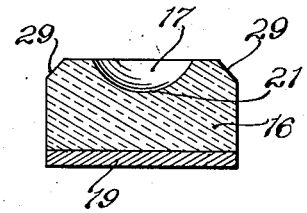
Inventor:
Frederick C. Holtz
Brown, Jackson, Boettcher & Diener
By  Attys.

Patented July 6, 1937

2,085,751

UNITED STATES PATENT OFFICE 2,085,751

JEWEL BEARING FOR ELECTRIC METERS AND THE LIKE

Frederick C. Holtz, Springfield, Ill., assignor to Sangamo Electric Company, Springfield, Ill., a corporation of Illinois Application July 3, 1935, Serial No. 29,604

9 Claims. (Cl. 308—159)

This invention relates generally to bearings, and is more particularly concerned with bearings of the type employed for supporting the moving system, i. e., the spindle, the aluminum meter disc and the worm carried by said spindle, of integrating meters and other like instruments of precision.

It is extremely important in instruments of the type above described that error, due to friction between the spindle and its supporting bearing, be minimized as much as possible. As heretofore constructed, the supporting bearings for instruments of this type have in general comprised a cup jewel forming a seat for the lower end of the spindle, the jewel and spindle being so designed as to reduce friction to a minimum and thereby insure reasonably accurate operation of the meter. This cup jewel is supported in the meter by a mounting screw, the screw having its upper end provided with a longitudinal bore, the diameter of which very closely approximates the diameter of the jewel, forming a receiving cup for the jewel. The jewel seats in this cup, and the upper end of the screw, forming the walls of the cup, are spun or burnished over against the jewel to thereby firmly hold it in position in the screw.

The jewels of these bearing assemblies are subject to deterioration through numerous factors which require their replacement from time to time in order to insure satisfactory operation of the meter. For example, the bearing assembly carries substantially the entire weight of the moving system, and the major load imposed on the bearing is in the nature of a vertical thrust load of the weight of the moving system. While the weight of the moving system is comparatively small, nevertheless in any severe jar or shock to the instrument, the inertia of the moving system may be sufficient to crack, scratch, or in some other way mar the rather delicate bearing surface of the jewel, particularly when the inertia is acting downwardly in a substantially straight line. Furthermore, vibration or any unusual radial loads imposed upon the moving system is apt to cause rubbing of the spindle on the jewel and, even under ordinary conditions of use, the wear on the jewels is of such proportions that readjustment of the bearing and new jewels may be necessary from time to time in order to preserve satisfactory operation.

When such a condition occurs as requires a jewel to be replaced, it has been necessary, with the type of bearing assembly above described, to discard the entire assembly and to substitute a new bearing assembly therefor. These bearing assemblies are relatively small, and it has not been found practical or economical to remove the old jewel from the mounting screw and to change the various dimensions so as to permit of mounting a new jewel in said screw, at the same time keeping the various distances and dimensions to a fixed standard.

A further disadvantage in the above described bearing assembly resides in the fact that the oil which it is desirable to keep on the wearing surface of the jewel gradually seeps down and around the jewel into the bore in the screw, where this oil becomes confined by the jewel. If this oil has been subjected to deterioration through numerous factors which would make it desirable to clean the assembly of the old oil, such oil cannot be removed in any mere cleaning operation because of the substantially permanent mounting of the jewel in the screw.

Broadly, the chief object of the present invention is to provide a new and improved form of bearing assembly for the moving system of the above described instruments. This new and improved bearing assembly comprises an improved screw, the upper end of which is provided with a longitudinal bore drilled to a depth somewhat greater than has formerly been the case. The upper end of this bore is then enlarged to a diameter closely approximating the diameter of the jewel. The enlarged bore is then threaded to receive a jewel retaining member in the form of a threaded sleeve. After the jewel is seated in the enlarged bore, the sleeve is threaded therein into contact with the jewel and serves to retain the jewel in the bore. If conditions occur which would necessitate removal of the jewel, the jewel retaining sleeve may quickly and easily be unscrewed from the screw and the jewel readily removed therefrom and, if necessary, replaced with a new jewel, after which the retaining sleeve may again be replaced.

More specifically, another object of the invention is, therefore, to provide a new and improved construction of bearing assembly in which the bearing surface or jewel may readily be removed or replaced. Such construction of bearing assembly is advantageous in that if the bearing surface of the assembly becomes cracked, worn or scratched, it is only necessary to replace the bearing element and not to discard the entire bearing assembly. There is thus a definite saving in maintenance cost with the bearing of my invention.

Another feature of the invention resides in so constructing the screw of the bearing assembly that a relatively flat, true mounting surface or seat can be obtained for the jewel. By providing the first mentioned bore in the screw, of smaller diameter and of greater depth than the enlarged bore which receives the jewel, an accurate shoulder is formed within the jewel receiving cup which provides a true, stable mounting for the jewel. As the bore in the screw was heretofore formed, the center material could not readily be removed in one operation and at the same time leave a sufficiently accurate surface upon which the jewel could properly seat.

A still further object of the invention is to provide a bearing assembly of the class described with means for maintaining very close tolerances between the bottom of the spherical cup of the jewel, in which the spindle of the moving system rests, and the shoulder formed by the head of the screw. In the ordinary procedure of manufacturing the jewels themselves, it is not possible to maintain extremely close tolerances for the distance between the bottom of the spherical cup, against which the pivot rests, and the bottom surface of the jewel. Because of this and other factors incident to the ordinary manufacture of the complete bearing assembly, it has not heretofore been possible to maintain very close tolerances between the spherical cup of the jewel and the shoulder of the screw. These close tolerances are frequently desirable. My invention obtains these very close tolerances by cementing a washer or shim, such, for example, as paper or any other suitable material, to the bottom face of the jewel. This paper or other material will be of such thickness as to maintain the dimension between the spherical cup of the jewel and the head of the screw within the desirably close tolerances. In addition, this washer will act as a cushion and distribute any pressure on the lower face of the jewel more uniformly around its entire circumference.

A further object of the invention, therefore, is to provide a cushioning element between the jewel and its seat in the screw.

Still another object of the invention is to provide means on the jewel and its cooperating retaining sleeve to automatically center the jewel with respect to the axis of the screw. This means comprises cooperating conical surfaces formed on the jewel and retaining sleeve, which surfaces come into engagement and automatically center the jewel in the screw, and at the same time enable sufficient pressure to be applied to the jewel to firmly set it in its mounting.

A still further object of the invention resides in providing a bearing assembly of the class described with an oil reservoir. This oil reservoir comprises the first mentioned bore which extends below the enlarged, jewel receiving bore. In the process of assembling, the first mentioned bore is filled with oil before mounting the jewel, thereby providing a reserve quantity of oil and preventing oil which is finally placed on the upper surface of the jewel from seeping down into the oil reservoir. If the oil on the wearing surface of the jewel becomes depleted the oil from the reservoir can seep around the paper washer and get up to the wearing surface of the jewel.

From the above, it will be apparent that after the bearing assembly has been in use for a period of time and it becomes necessary to clean the assembly or to replace the jewel because of wear, etc., it will not be necessary to discard the entire assembly. With the present invention, the jewel retaining sleeve is removed, which permits removal of the jewel either for cleaning or replacement, the entire mounting can be thoroughly cleaned, all of the old oil eliminated and a new supply of oil provided, and the bearing then reassembled.

Other objects and advantages of the invention will appear from the following detailed description when taken in connection with the accompanying drawing, in which all of the parts are illustrated on a very enlarged scale. In this drawing:

Figure 1 is a front elevational view, partly in section, of a bearing assembly embodying the principles of the present invention;

Figure 2 is a top plan view of the jewel retaining sleeve on a still larger scale;

Figure 3 is a vertical sectional view taken substantially along the line 3—3 of Figure 2; and Figure 4 is a vertical sectional view of the jewel employed in my improved bearing assembly and showing the cushion pad secured to the lower surface thereof, this view also being on a larger scale.

Referring now in detail to the drawing, I have shown only so much of the moving system of an integrating meter, comprising the spindle 5 and the aluminum meter disc 6 rigidly secured to the spindle 5 by means of the hub 7 and the set screw 8, as is necessary to an understanding of my invention.

The new and improved bearing assembly of the present invention comprises a bearing screw 11 formed of any suitable material, and externally threaded as indicated at 12 to cooperate with internal threads formed on some stationary part of a meter, such, for example, as the frame or meter housing. At its upper end, the screw is preferably reduced in diameter to form a jewel receiving or housing portion 13 for the reception of the bearing jewel and its cooperating elements. The portion 13 is prepared to receive the bearing jewel by first boring down from the upper end thereof to form a bore 14 of relatively small diameter. Bore 14 is then enlarged for approximately half its length, as indicated at 15, by a second boring operation, this second bore being of a diameter closely approximating the diameter of the jewel 16.

Jewel 16 is preferably a sapphire jewel of the type commonly employed in these bearing assemblies, being provided with a spherical cup or recess 17 for rotatably supporting the lower end of spindle 5. This jewel is received in enlarged bore 15 of housing 13 and seats on a shoulder 18 which is formed during the process of enlarging bore 14. Shoulder 18 provides a flat, accurate seat for jewel 16, which is of distinct advantage over those forms of bearings wherein the center material of the housing is removed by a single operation, the drilling operation leaving a conical depression and resulting in an unstable mounting of the jewel.

Preferably, a washer 19, which may be formed of paper or any other suitable material, is cemented to the under surface of jewel 16 and is thereby interposed between said jewel and shoulder 18. This washer has several distinct advantages. It is formed of a certain definite thickness to maintain a certain definite dimension between the bottom 21 of the spherical cup or recess 17 and the shoulder 22 formed by the head 23 of screw 11. Variations arising in the distance between the bottom 21 of the jewel cavity 17 and the bottom surface of the jewel are readily compensated for by these washers. Thus by employing washers of different calibrated thicknesses, closer tolerances may be obtained between the bottom of spherical cup 17 and shoulder 22 of head 23 than have heretofore been possible. In addition, the washer 19 acts as a pad or cushion between the jewel 16 and shoulder 18, thereby forming a yieldable mounting for the jewel and distributing any pressure which may be imposed on the lower face of the jewel more uniformly around its entire circumference. A still further advantage of the washer is that, being permeable to oil, it allows the oil from the reservoir 14 to seep to the wearing surface of the jewel.

Jewel 16, when seated in enlarged bore 15, has its surface disposed substantially below the upper surface of housing 13. The portion of bore 15 disposed above the upper surface of the jewel is internally threaded as indicated at 24, to cooperate with external threads 25 formed on a jewel retaining member, designated 26. Jewel retaining member 26 may be formed of any suitable metal and is preferably in the form of a ring or sleeve. Preferably, the upper edge of ring 26 is provided with opposed notches or slots 27 to receive cooperating lugs formed on a suitable spanner wrench (not shown), whereby the ring may readily be threaded into or out of bore 15. At its lower edge, ring 26 is chamfered off to provide a conical surface 28, preferably of an angle of approximately 45° adapted for engagement with a matching conical surface 29 formed on the upper surface of jewel 16. When jewel 16 is seated on shoulder 18 and ring 26 is threaded into bore 15, the engagement between the conical surfaces 28 and 29 automatically centers the jewel with respect to the axis of bores 14 and 15 as well as the axis of the screw 11. At the same time, sufficient pressure may be exerted upon ring 26 through the aforementioned wrench to firmly set jewel 16 on shoulder 18.

Bore 14 extending below the jewel 16 and below the shoulder 18 is preferably utilized as an oil reservoir. It is desirable that oil be kept on the top or wearing surface of the jewel at all times. In the process of assembling the bearing, I fill the bore 14 with oil, after which the jewel 16 may be set in place on shoulder 18 and clamped thereto by the retaining ring 26. Because of the oil-filled reservoir, oil which is subsequently placed upon the upper surface of the jewel will be prevented from seeping into bore 14 and therefore disappearing from the wearing surface of the jewel, which should have continued lubrication. It will also be noted that by reason of the use of ring 26, and because of the height thereof, a much greater supply of oil can be retained upon the wearing surface of the bearing than is the case in prior constructions, where the upper edge of the housing is spun directly over the upper surface of the jewel. The oil in the reservoir 14 can seep past the permeable paper washer and thereby replenish the supply of oil on the wearing surface of the jewel.

From the foregoing, it will be apparent that after a bearing assembly embodying the principles of the present invention has been in use over a period of time, and it becomes necessary to clean the assembly or to replace a worn jewel, the bearing may readily be disassembled for such purpose by merely removing retaining ring 26 and jewel 16. The various elements of the assembly may then be readily cleaned, a new supply of oil placed in the reservoir, and a new jewel, if necessary, inserted into housing 13 and clamped therein by ring 26, after which the bearing assembly is again ready for use. It is not necessary to discard the entire assembly, as has heretofore been the practice. With the present invention, it is only necessary to furnish users of the assembly with new jewels, rather than a complete assembly, thus making a definite saving in maintenance cost.

While a preferred embodiment of the invention has been illustrated and described by way of example, it will be obvious that changes may be made therein within the spirit and scope of the invention, and, therefore, the invention is not to be limited to the form herein disclosed, except insofar as it may be so limited in the appended claims.

I claim:

1. A bearing assembly of the class described, comprising a housing, a jewel disposed in said housing, removable means comprising a ring adapted to be inserted into said housing, and a conical shoulder formed at the inner end of said ring and peripherally engaging said jewel upon the insertion of said ring into said housing to automatically center said jewel with respect to the axis of said housing.

2. A bearing assembly of the class described, comprising a housing having a shoulder therein, a jewel disposed in said housing, a spacing shim cemented to the jewel, removable means comprising a ring adapted for threading into said housing, and means comprising cooperating beveled surfaces formed on said ring and said jewel and engageable upon threading of said ring into said housing to automatically center said jewel with respect to the axis of said housing.

3. A bearing assembly of the class described, comprising a screw having one end reduced in diameter to form a bearing housing, a shoulder formed in said housing, yieldable means seating on said shoulder, a jewel seating on said yieldable means, removable means comprising a ring threading into said housing and retaining said jewel therein, and cooperating means formed on said removable means and said jewel and engageable upon threading of said ring into said housing to automatically center said jewel with respect to the axis of said housing.

4. A bearing assembly of the class described, comprising a threaded screw having one end reduced in diameter to form a bearing housing, a shoulder formed in said housing, yieldable means seating on said shoulder, a jewel seating on said yieldable means, removable means comprising an annular ring threading into said housing and retaining said jewel therein, and cooperating circumferential conical shoulders formed on said annular ring and jewel and engageable upon threading of said ring into said housing to automatically center said jewel with respect to the axis of said housing.

5. A bearing assembly of the class described comprising a screw having a reduced portion forming a bearing housing, said bearing housing having a bore relatively small diameter formed therein and said bore being counter-bored for a portion of its length to thereby provide a shoulder forming a flat jewel supporting seat, the portion of said first named bore disposed below said shoulder forming an oil reservoir, a jewel supported on said shoulder, and a ring insertable into said housing into direct contact with said jewel to restrain movement of said jewel away from said shoulder.

6. A bearing assembly of the class described comprising a screw having a reduced portion forming a bearing housing, said bearing housing having a bore of relatively small diameter formed therein and said bore being counter-bored for a portion of its length to thereby provide a shoulder forming a flat jewel supporting seat, the portion of said first named bore disposed below said shoulder forming an oil reservoir, a jewel supported on said shoulder, and a ring insertable for its full length into said housing and into direct contact with the jewel irrespective of the height thereof to restrain movement of said jewel away from said shoulder.

7. A bearing assembly of the class described comprising a screw having a reduced portion forming a bearing housing, said bearing housing having a bore of relatively small diameter formed therein and said bore being counter-bored for a portion of its length to thereby provide a shoulder forming a flat jewel supporting seat, the portion of said first named bore disposed below said shoulder forming an oil reservoir, yieldable means seating on said shoulder, a jewel seating on said yieldable means, and a ring insertable for its full length into said housing and into direct contact with the jewel irrespective of the height thereof to restrain movement of said yieldable means and said jewel away from said shoulder.

8. In combination a jewel receiving member including a flat supporting seat, a jewel disposed within said member and supported upon said seat, and clamping means insertable into said member and clamping said jewel upon said seat, said clamping means and said jewel both having cooperating means formed thereon and operable upon insertion of said clamping means into said member to shift said jewel laterally upon said seat and thereby automatically center said jewel with respect to the longitudinal axis of said member.

9. In combination a jewel receiving member including a flat supporting seat, a jewel disposed within said member and supported upon said seat, and a ring insertable into said member and clamping said jewel upon said seat, said ring and said jewel each having beveled shoulders formed thereon and said shoulders being operable upon insertion of said ring into said member to shift said jewel laterally upon said seat and thereby automatically center said jewel with respect to the longitudinal axis of said member.

FREDERICK C. HOLTZ.